March 14, 1967  H. SCHLEIN  3,309,614
VOLTAGE DETECTION CIRCUIT
Filed Oct. 18, 1963  2 Sheets-Sheet 1

INVENTOR.
HELMAR SCHLEIN
BY
ATTORNEY

United States Patent Office 3,309,614
Patented Mar. 14, 1967

3,309,614
VOLTAGE DETECTION CIRCUIT
Helmar Schlein, Reseda, Calif., assignor to North
American Aviation, Inc.
Filed Oct. 18, 1963, Ser. No. 317,333
3 Claims. (Cl. 328—147)

The present invention is directed to voltage detecting circuits and more particularly to circuits for detecting predetermined voltage levels, their sense and sequence.

In electrochemical apparatus the detection of precise voltage levels is essential. While voltage level detection means are familiar in the art, certain operational requirements make them unsuitable for the precision measurements required in the electrochemical area utilizing fast controlled potential sweeps with simultaneous integration of current. (See Bowman et al., Anal. Chem., 29, 213 (1957) for an example of this experimental area.) A voltage level detector or voltage sensitive trigger suitable for use in such precision electrochemical systems must have a fast rise time and must accurately detect a plurality of voltage levels, but only when the voltage levels occur in a predetermined but variable order. The primary object of the present invention is to provide a detecting circuit which is particularly adapted for use with electrochemical apparatus requiring accurate control of a counter and which will accept signals only during a preset signal excursion.

Another object of the present invention is to provide apparatus for precise voltage detection where the voltage level to be detected may be varied in a simple and inexpensive manner.

A further object of the present invention is to provide voltage level detecting apparatus which detects a preselected pair of sequential voltage levels on either the increasing or decreasing portion of an applied varying voltage.

A still further object of the present invention is to provide switching apparatus which detects preselected voltage levels on a varying input voltage in a predetermined order of occurrence in which the levels as well as the order of occurrence may be varied.

These and other objects of the present invention will become more apparent from the following detailed description of the present invention taken together with the drawings, hereby made a part thereof, in which.

Figure 1:
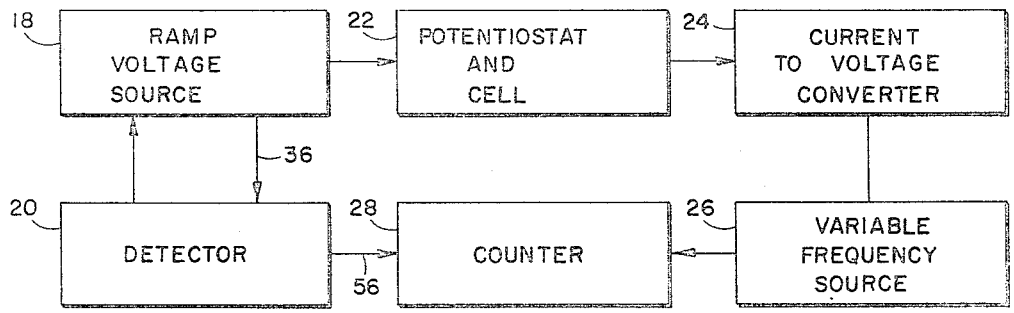
FIG. 1 shows a system utilizing the detector of the present invention.

The present invention is herein described as used in electrochemical experimental apparatus to illustrate its function as a unilateral slope detector as well as a voltage level detector. FIG. 1 shows an electrochemical system in which the detector of the present invention is utilized in conjunction with standard components. Since these standard components are well-known they will not be described in detail but their function in the system will be explained only insofar as it concerns the operation of the detector of the present invention. Thus, the standard ramp voltage generator 18 has its output connected to the detector 20 and through a potentiostat to an indicator electrode of an electrochemical cell 22. The potentiostat is a standard circuit utilized in this system in conjunction with a cell having a dropping mercury electrode in which electrical measurements are to be made. The current flowing through the cell is converted to a voltage signal at 24, by standard circuitry, which voltage drives a variable frequency source 26. The source 26 is connected to a counter 28 through a gate within counter 28 which is controlled by detector 20. In this manner an integral may be obtained across any desired potential sweep. Complete details on the operation of such a system may be found in Osteryoung, et al., Integration of Single Sweep Oscillopolarograms, J. Electrochemical Society, vol. 110, 926–932 (1963) and therefore are not described herein. The detector of the present invention is utilized in the above described system to control the counter 28 in response to predetermined voltage levels of the voltage source 18.

Figure 2:
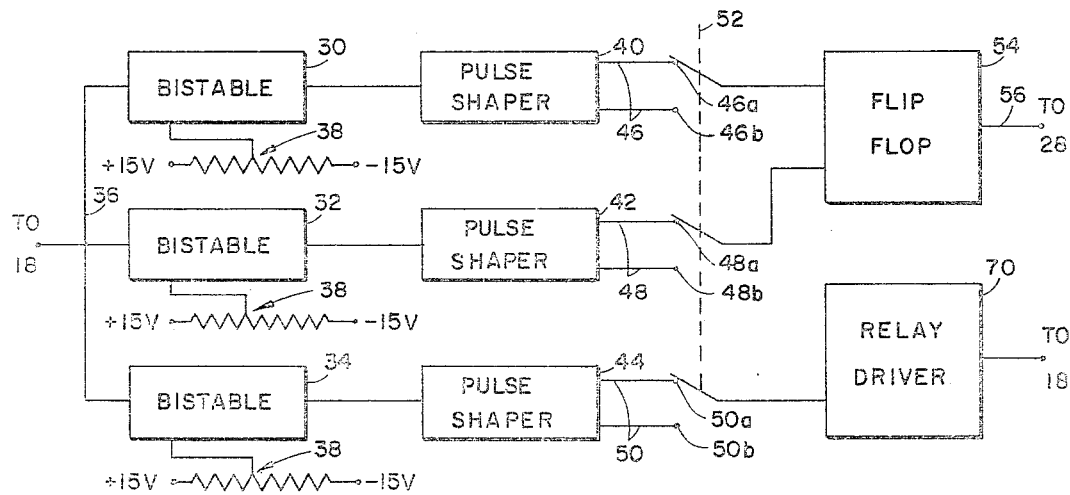
FIG. 2 is a circuit diagram of the present invention.

Referring now to FIG. 2, showing the general circuit arrangement, the present invention comprises six bistable circuits of standard design. Bistables 30, 32 and 34 have their inputs 36 connected to variable voltage source, e.g., a ramp voltage source 18 in the preferred embodiment, and are each provided with a variable voltage level setting means 38 consisting of a potentiometer connected to a pair of voltage sources. The voltage sources connected at opposing ends of the potentiometer are +15 v. and −15 volts in the preferred embodiment. In this manner the voltage level may be selected at any value between nominally +5 v. and −5 v. including a zero voltage value. The span may include only a portion of the entire range from nominal plus 5 v. to minus 5 v. depending upon the sensitivity desired for the voltage sources of the preferred embodiment. In this arrangement with a preselected voltage level setting at 38, the output of each bistable 30, 32, 34 will be either −3 or −11 volts depending upon whether the input voltage at 36 is above or below the value represented by the reference voltage at 38. The outputs of each bistable 30, 32 and 34, which provides a voltage level shift whose rate of change is a function of the rate of change of the input at 36, are connected to a pulse shaper circuit 40, 42 and 44, respectively. The pulse shaping circuits in the preferred embodiment are bistable circuits similar to 30, 32 and 34 and each have a pair of outputs 46, 48 and 50, respectively, which have a fast use time in response to the relatively slowly varying signal from bistable 30, 32 and 34. Each pair of outputs 46, 48 and 50 have complementary voltage levels of −3 and −11 volts and switch to opposite voltage levels when the output of the respective bistable 30, 32 and 34 switches.

The output of pulse shaper 40 and 42 are connected through switch 52 to a standard RST flip-flop 54 which accepts only positive going pulses. Thus, for example, if circuits 30 and 32 have reference voltage settings of −.5 v. and −.75 v., respectively, then, when the first trigger (30, 40) fires, the output 56 of flip-flop 54 goes from −3 to −11 v. When the second trigger (32, 42) fires, i.e., when the input voltage at 30 reaches −.75 v., the output 56 of flip-flop 54 returns to −3 volts. During the return of the input voltage to its initial value the triggers switch at their respective set potentials but the flip-flop 54 remains inactive. This operation is more apparent from FIGURE 3 where the ramp voltage at the input 36 is plotted as a function of time. For the above mentioned reference voltage settings, the output at 46 will be changed to opposite voltage levels at point 58 and circuit 54 will generate a negative eleven volt output at 56. This output will be maintained until point 60 is reached on the input ramp voltage at which time the output 48 of the second trigger (32, 42) will be changed to opposite voltage levels, i.e., from −3, −11 to −11, −3 and the circuit 54 will respond by discontinuing the −11 volt output at 56.

Figure 3:
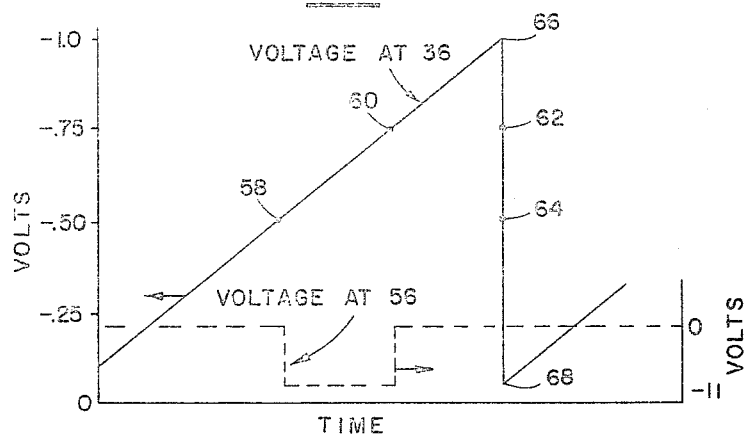
FIG. 3 is a graph showing the operating characteristics of the circuit of FIG. 2.

As the voltage at 36 returns to its initial value it passes through the −.75 volt and −.5 volt level as at points 62 and 64 of FIG. 3. Outputs 46 and 48 will again be changed to opposite voltage levels but circuit 54 is responsive only to positive going pulses and therefore negative going pulses have no effect on circuit 54. The output 56 is connected to counter 28 to energize a gate so that counting takes place only during the interval between the voltage settings of the first and second triggers, i.e., between −.5 and −.75 volt.

The switch 52 may connect either output 46a and 48a or 46b and 48b to circuit 54. In this manner the sequence upon which the circuit 54 generates an output voltage may be changed. As explained above, if switch 52 connects 46a and 48a to circuit 54, the voltage level sequence must be in the direction of from −.5 to −.75 volt for the circuit 54 to operate. However, if switch 52 connects 46b and 48b to circuit 54 the voltage level change must be in the direction of from −.75 to −.5 volt. In this manner either the positive or negative slope of the applied ramp voltage, i.e., either voltage levels 58 and 60 or voltage levels 62 and 64, can be accurately detected without cross-talk between the two modes of operation. Thus, gates or other circuits may be selectively operated on either a rising or declining voltage slope.

Figure 4:
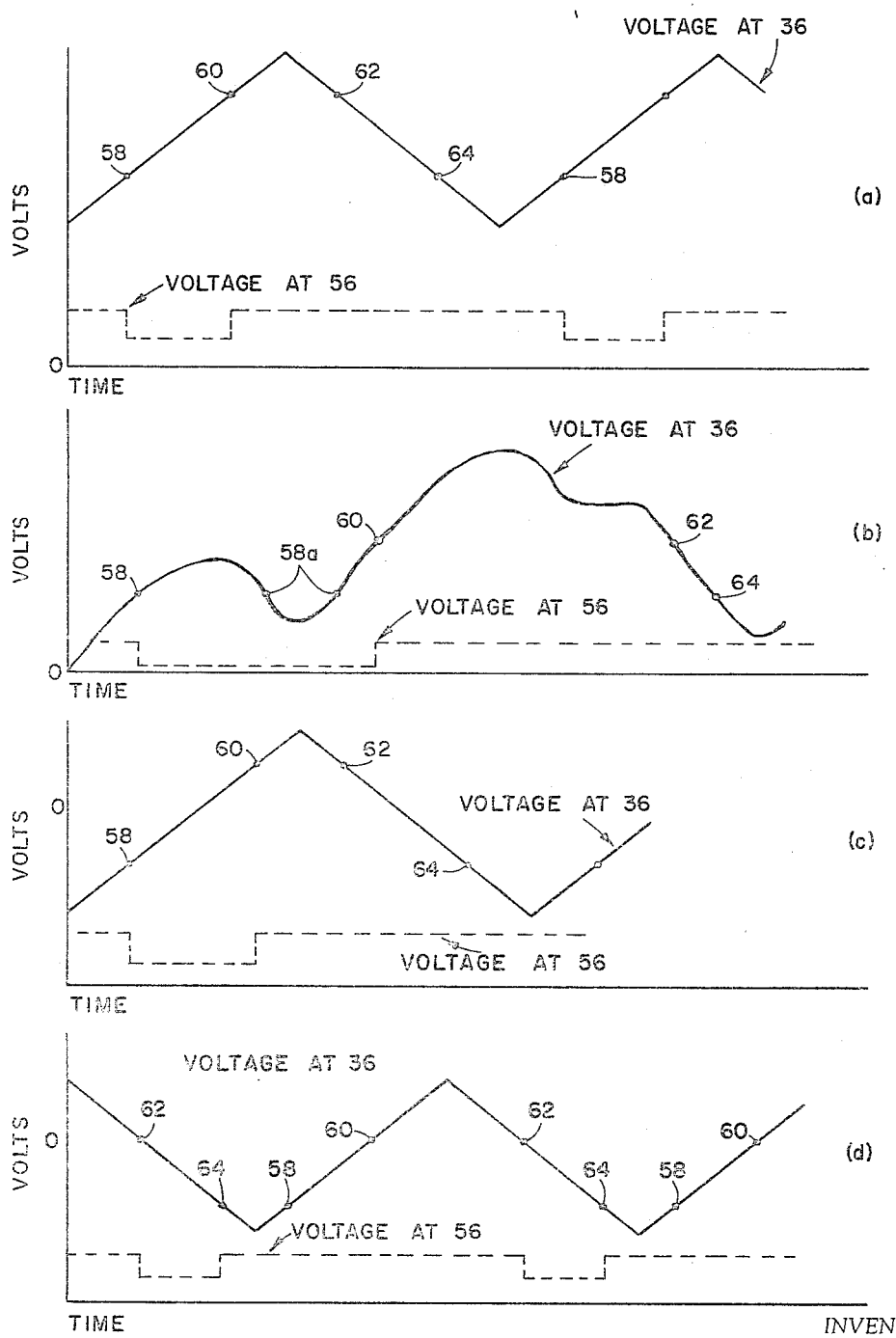
FIG. 4 is a series of graphs illustrating various modes of operation of the circuit of FIG. 2.

FIG. 4(a–d) illustrate the operation of the present invention under a variety of conditions. In FIG. 4(a) the voltage form applied to leads 36 is a triangular wave where the switch 52 is positioned to detect voltage levels, 58 and 60, only when they occur in the prescribed sequence, i.e., on the positive slope of the triangular wave. FIG. 4(b) shows an applied voltage wave of complex form and illustrates the use of the present invention with input voltages where the applied voltage is not a linear ramp and where the applied voltage passes through the first voltage level both in a positive and negative going direction before it reaches the value of the second voltage to be detected. In this case only levels 58 and 60 will be detected and voltage levels at 62 and 64 will not affect the voltage output at 56 for the particular setting of switch 52. Further, the fact that the voltage level 58a is passed through in both the negative and positive direction subsequent to the initial detection of the voltage level at 58 has no effect on the output 56 for the assumed setting of switch 52. If switch 52 is changed from the position shown in FIG. 2 to its second position only levels 62 and 64 will be detected and the detection will take place only if the voltage levels are detected in the prescribed order. Thus, at this position of switch 52 (not shown) the voltage levels 58, 58a and 60 would have no effect on the output 56. Only if the voltage form is decreasing, i.e., a negative slope, with voltage level 62 occurring before level 64 will the output at 56 be affected for the setting of switch 52.

FIGS. 4(c) and (d) illustrate the utility of the present invention in detecting two voltage levels where one voltage level is negative and the other voltage level is positive. Thus, the range of voltage which may be detected extends across the zero voltage point. As shown in FIG. 4(d) the zero voltage level may be detected either on the positive slope portion of the wave form, as at 60, or on the negative slope portion of the wave form, as at 62, depending upon the selection of the position of switch 52. It should be noted that the zero voltage level may be either the first or second voltage level detected, as may be required for the particular associated system.

Referring again to FIG. 2, bistable 34 and pulse shaper 44 comprise a third trigger which is utilized in the preferred embodiment for controlling the ramp voltage source 18. The third trigger is set, by means of voltage level setting 38, to operate at a voltage beyond the voltage range or level of the other two triggers discussed above. For the voltage levels and position of switch 52 noted above, the output 50 of pulse shaper 44 will change from −3 to −11 volts when the ramp voltage reaches the voltage level setting of one volt, i.e., at point 66 of FIG. 3. In this manner the voltage applied to the potentiostat is controlled. When the switch 52 is moved to its second position, i.e., connecting terminal 50b to the relay driver, the voltage level detected is at point 68. The relay driver 70 is connected to the ramp voltage generator 18 and controls its operation to stop or reset the input signal, or slow it down, speed it up or reverse it.

While the present invention has been described as utilizing an input ramp voltage of a particular type, sawtooth, triangular and sinusoidal input waves have been utilized without false triggering. Further, uses other than in electrochemical measurement systems will be apparent to those skilled in the art. For example, the present invention may also be utilized to measure the average linearity of a voltage ramp or to gate selected portions of sine or cosine waves. These as well as other modifications are within the purview of the present invention as defined in the appended claims.

What is claimed is:
1. A unilateral slope detector comprising a source of varying voltage, first means responsive to a first preselected value of said varying voltage to generate a first signal, second means responsive to a second preselected value different from said first valve of said varying voltage to generate a second signal, third means connected to each of said signal generating means and selectively responsive to a preselected order of said first and second signals for generating a first control signal when said first value is reached and a second control signal when said second value is reached so that said first and second control signals are generated only when said first and second signals are generated in said preselected order, and a separate reference voltage generator means connected to each of said first and second named means for varying said preselected value independent of said voltage source.

2. The apparatus of claim 1 wherein said first and second means each include a pair of different voltage level terminals and wherein said third means includes switch means for connecting one of each of said terminals to said third means.

3. The apparatus of claim 2 including fourth means for monitoring said varying voltage level and for comparing said monitored signal to a third preselected variable voltage value, said third value being outside of the range between said first and second preselected values, said fourth means generating a fourth signal when said varying voltage reaches said third preselected value.

References Cited by the Examiner
UNITED STATES PATENTS

| 2,685,687 | 8/1954 | Folk | 328—150 X |
| 3,017,537 | 1/1962 | Nadir | 332—9 X |
| 3,058,013 | 10/1962 | Acker | 307—88.5 |
| 3,082,379 | 3/1963 | Circuit | 328—150 X |
| 3,192,408 | 6/1965 | Yohan Cho | 307—88.5 |

ARTHUR GAUSS, *Primary Examiner.*

J. JORDAN, *Assistant Examiner.*